July 12, 1966  C. S. WHITE  3,259,963
METHODS OF CONSTRUCTING ELEMENTS HAVING
LOW FRICTION PRESSURE ENGAGEMENT
Original Filed Nov. 1, 1956  3 Sheets-Sheet 1
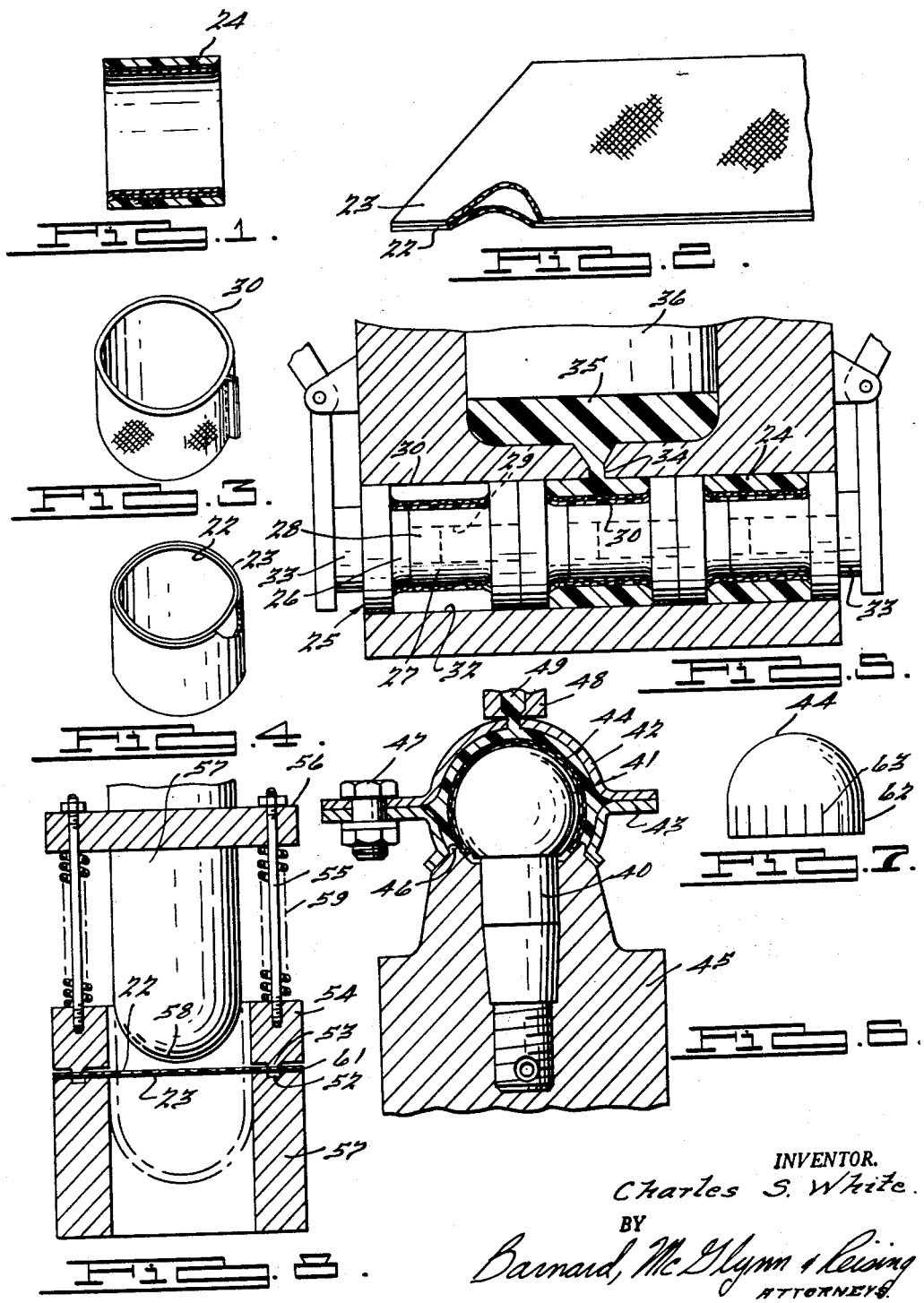
INVENTOR.
Charles S. White.
BY
Barnard, McGlynn & Reising
ATTORNEYS

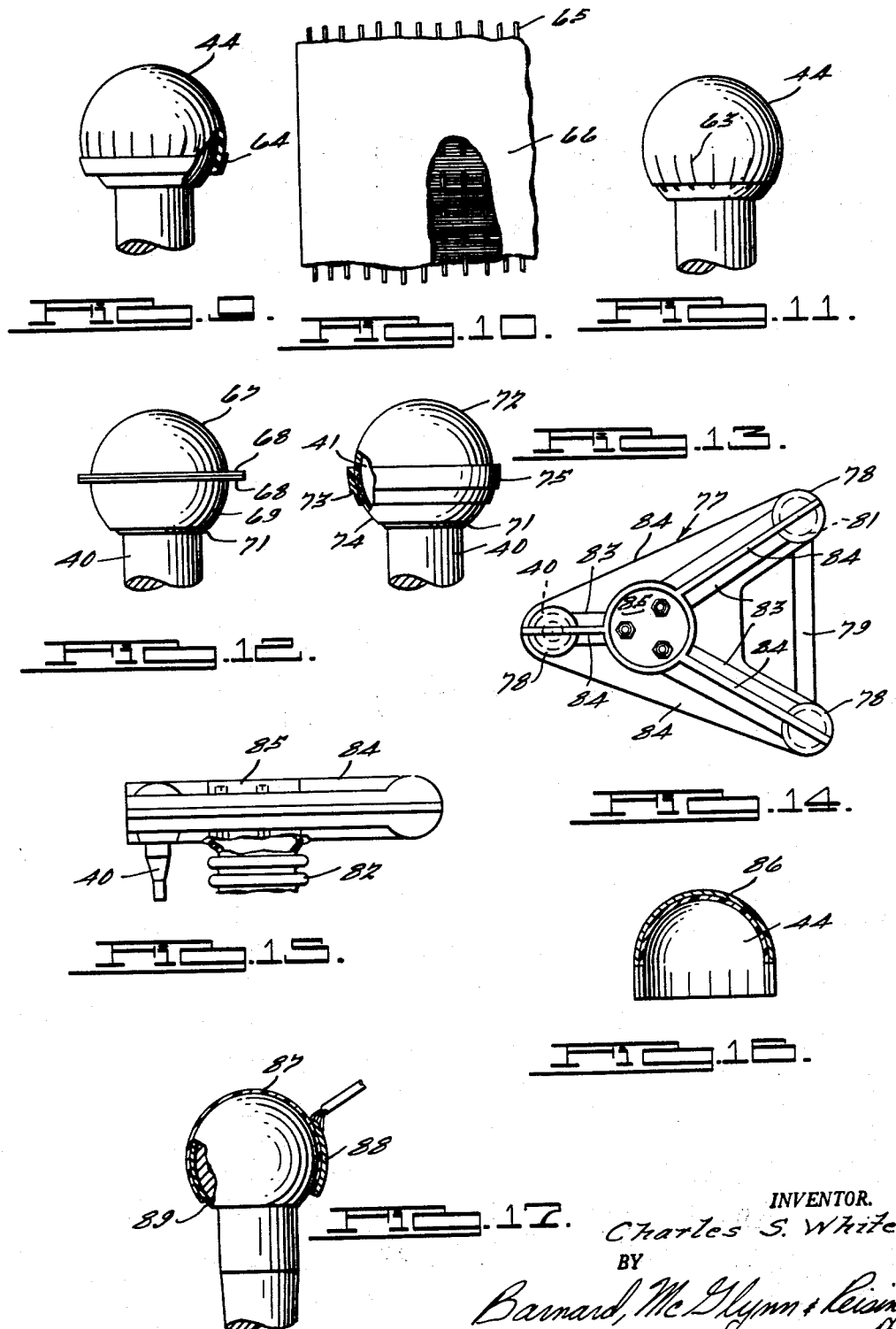

July 12, 1966   C. S. WHITE   3,259,963
METHODS OF CONSTRUCTING ELEMENTS HAVING
LOW FRICTION PRESSURE ENGAGEMENT
Original Filed Nov. 1, 1956   3 Sheets-Sheet 3
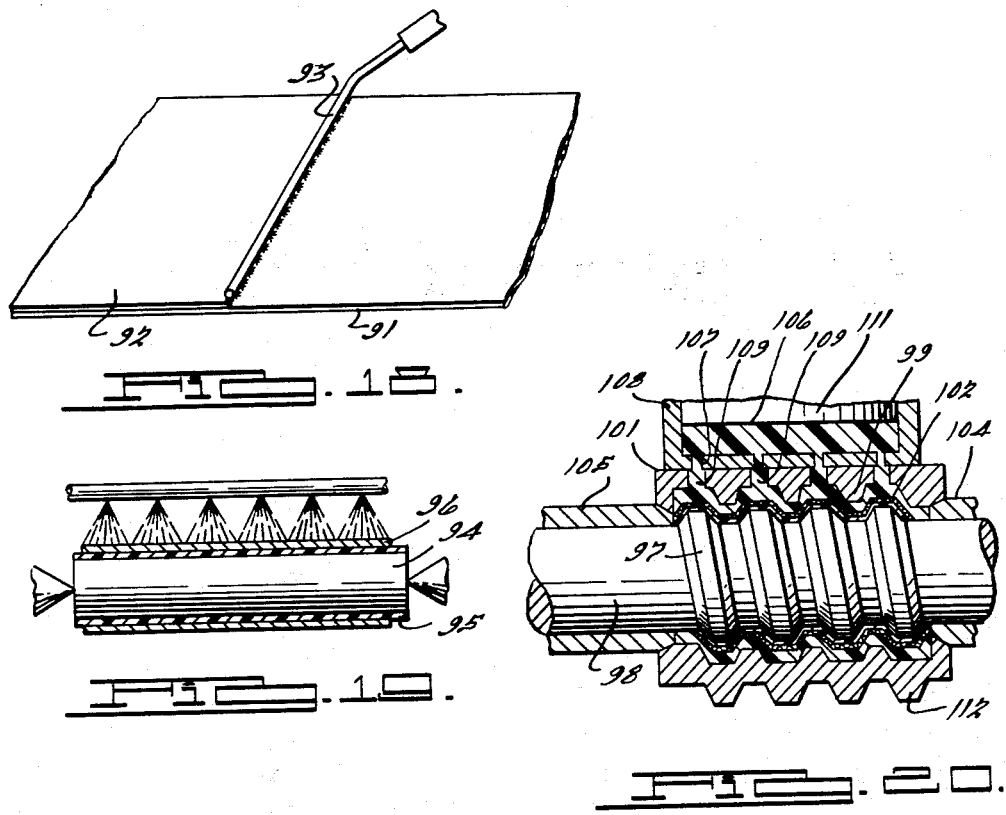
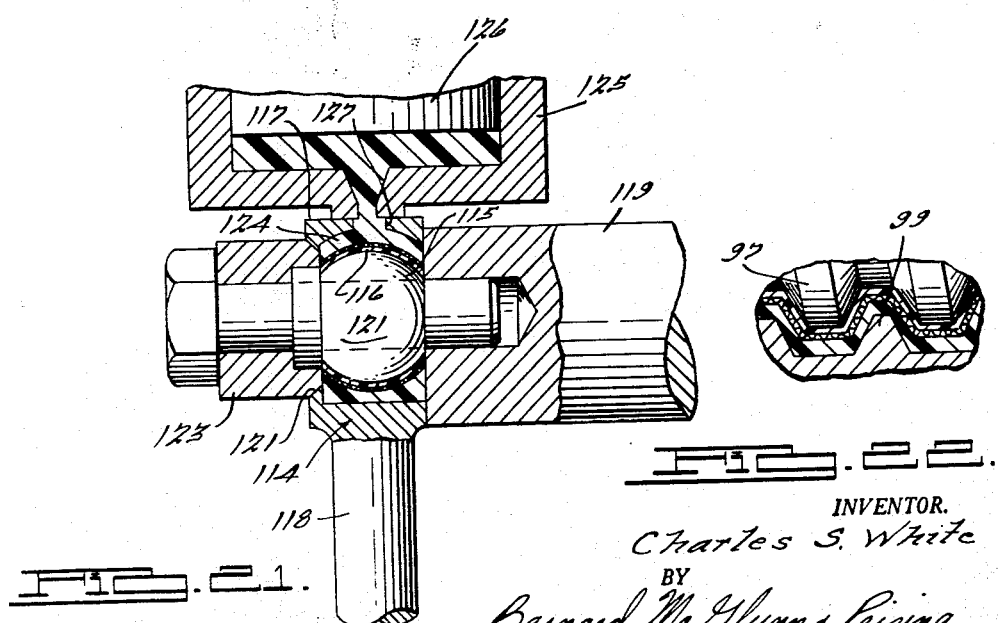
INVENTOR.
Charles S. White
BY
Barnard, McGlynn & Leising
ATTORNEYS.

United States Patent Office 3,259,963
Patented July 12, 1966

3,259,963
METHODS OF CONSTRUCTING ELEMENTS HAVING LOW FRICTION PRESSURE ENGAGEMENT
Charles S. White, 35826 41st St., Palmdale, Calif.
Continuation of application Ser. No. 855,896, Nov. 27, 1959, which is a continuation of application Ser. No. 619,782, Nov. 1, 1956. This application Oct. 21, 1963, Ser. No. 317,732
5 Claims. (Cl. 29—149.5)

The present application is a continuation of the copending application of Charles S. White, Serial No. 855,896, filed November 27, 1959, and now abandoned, which is a continuation of Charles S. White application Serial No. 619,782, filed on November 1, 1956 and now abandoned.

This invention relates to methods of making engaged elements having low friction mated surfaces, and particularly to elements having mated surfaces which are retained in mated relation under pressure by a material molded thereabout.

In reissue patent of Charles S. White, No. 24,765, issued January 1, 1960 for Low Friction Fabric Material, a complete disclosure is made of woven Teflon threads having bondable cords secured on the back face thereof. The Teflon material has extremely low friction characteristics and high heat resistance but in sheet and powdered form is subjected to cold flow. Because of the extremely low friction characteristics, it is substantially impossible to bond the Teflon material directly to other materials. By weaving the bondable cords on a woven fabric of Teflon, the bondable cords can be readily secured to other materials, thereby anchoring the woven Teflon material thereto. This provides a composite material with a face having extremely low frictional properties. In view of the fact that the woven material is made from threads of Teflon, cold flow is no longer present. When the Teflon is drawn into threads, its tensile strength is twenty-five times greater than the Teflon in sheet form. This additional strength substantially reduces or eliminates entirely the difficulty heretofore experienced due to cold flow. Material may now be provided with a low friction surface which resists cold flow, which withstands 500° F. temperature, and which may be bonded or otherwise secured to other materials.

While it is possible to produce spherical surfaces within a housing and on a ball, it is practically impossible to maintain diameters while doing so, and as a result mated machined spherical elements could not be obtained commercially. The present method of forming a ball and socket joint embodies the use of a thin flexible cap having a face of woven Teflon fibre material which is placed about the ball. Thereafter, a material is forced about the cap which, when hardened, forms a housing for retaining the engaged low friction surface in operating relation to the surface of the ball under a predetermined pressure.

The present invention further contemplates the use of a housing and ball and the coverage of Teflon material about the ball surface and the application of a filler material which may be resin, metal and any other material which may be applied hot or cold and thereafter hardened. When heat is employed, the temperature should be low and the material cooled as quickly as possible so that the temperature of the Teflon material on the ball does not rise beyond the 500° F. limit. Thus, die-cast materials, including alloys of zinc, aluminum and the like may be cast directly upon the Teflon material about the ball to form a housing thereabout which may be employed separately or which may be a portion of an entire die-cast element. An A-frame for supporting the wheels of an automobile on a chassis frame or body may be made in this manner, with a joint of the present invention applied to the apex of the A and to the ends of the arms thereof. The ball, with the Teflon material thereabout, may be placed within a stamping and the space therewithin filled with a resin, metal and the like under pressure, to thereby form a ball joint when the material hardens. The same method may be employed for constructing cylinder and other types of bearings, as will be explained herein.

It is within the purview of the invention to shape the Teflon cloth material over any surfaces to produce an antifriction relation between two elements. For example, the thread of a nut and stud may have the Teflon material applied to the thread of one of the elements and a resin, metal or like material forced about the threads of the other element against the Teflon cloth material which, on hardening, will produce an antifriction thread engagement under pressure between the nut and stud, eliminating any backlash therebetween. The metal, resin or other material may be hot or cold when forcing the Teflon cloth material against a polished surface of an element so long as such material hardens thereafter. Such hardened materials retain the engagement between the surfaces and provide a predetermined pressure therebetween. Any flowable, formable, hardenable material known in the art to be suitable, whether molten, in powdered or other form, may be employed about the element over the Teflon cloth material. The material may fill the cavity of an encompassing housing or may be cast within a mold or die to produce the housing.

Accordingly, the main objects of the invention are: to provide low friction engaged bearing surfaces which are simple in construction and extremely durable; to force hardenable material about engaged hard and pliable low friction surfaces for retaining them in intimate relationship under pressure; to cast an operable element with one or more antifriction members having low friction characteristics cast therein; to employ a barrier between the back-up material and the engaging surface of the low friction material to prevent the bleeding of material therethrough; to provide a sufficient depth of pile to the flexible low friction element so that the contraction occurring during cooling may be taken up, thereby to control the amount of pressure engagement between the surfaces, and, in general, to provide a bearing having a low friction cloth material backed by a hard material which is simple in construction, which provides extremely low friction characteristics in the absence of lubrication, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a sectional view of a bearing having a low friction surface backed by a hardened material, embodying features of the present invention;

FIGURE 2 is a broken plan view of a strip of material forming the low friction portion of the bearing illustrated in FIGURE 1;

FIGURE 3 is a view of the material illustrated in FIGURE 2 when constructed in tubular form;

FIGURE 4 is a view of structure, similar to that illustrated in FIGURE 3, showing another form of the invention;

FIGURE 5 is a sectional view of structure which applies the hardenable material to the low friction material to form the bearing element;

FIGURE 6 is a sectional view of structure, similar to that illustrated in FIGURE 5, showing a further form of the invention;

FIGURE 7 is a view of the low friction fabric material applied to the polished ball of the structure illustrated in FIGURE 6;

FIGURE 8 is a view of structure employed to produce the element of FIGURE 7;

FIGURE 9 is a view of the element illustrated in FIGURE 7 as applied to the ball illustrated in FIGURE 6;

FIGURE 10 is a plan view of fabric material, similar to that illustrated in FIGURE 2, showing another form thereof;

FIGURE 11 is a view of structure, similar to that illustrated in FIGURE 9, with the material of FIGURE 10 applied thereto;

FIGURE 12 is a view of structure, similar to that illustrated in FIGURE 9, showing another method of applying the low friction material to the surface of the ball;

FIGURE 13 is a further form of the structure illustrated in FIGURE 12, with a part in section;

FIGURE 14 is a plan view of an A-frame for an automotive vehicle formed integral with the ball structure illustrated in FIGURE 6;

FIGURE 15 is a view in elevation of the structure illustrated in FIGURE 14;

FIGURE 16 is a view of structure, similar to that illustrated in FIGURE 7, showing a further form thereof as employed in the elements of FIGURES 14 and 15;

FIGURE 17 is a view of structure, similar to that illustrated in FIGURE 16, showing a further form thereof;

FIGURE 18 is a view of structure, similar to that illustrated in FIGURE 17, showing still another form of the invention;

FIGURE 19 is a view of structure, similar to that illustrated in FIGURE 17, showing a further application of the method as applied to the structure of FIGURE 17;

FIGURE 20 is a view of structure, similar to that illustrated in FIGURE 16, showing a further application of the present invention;

FIGURE 21 is a view of structure, similar to that illustrated in FIGURES 6 and 20, showing a still further application of the invention; and FIGURE 22 is a broken sectional view of structure, similar to that illustrated in FIGURE 20.

The present invention embodies the encompassing of a low friction material within a solid shell to form a low friction bearing. In another form an element has a low friction woven fabric held against a polished surface of a second element by a housing which provides pressure engagement between the surfaces of the elements. The material under pressure is applied about the woven material which, when hardened, forms a casing for enclosing the fabric material and retaining it in bearing relationship with the element having the polished surface. By way of example, several such bearing elements are illustrated. In FIGURE 1, a cylindrical sleeve type of bearing is shown having an internal face of low friction material. It is to be understood that the face of low friction material may be applied to the outer surface of the sleeve in substantially the same manner as the low friction material is applied on the inner face thereof.

Referring more specifically to FIGURES 1 to 5, a woven fabric material 22 has threads of low friction material forming the bearing face and cords of bondable material on the opposite face thereof. A thin layer 23 of woven material, which may be of cotton or other organic nature, or which may be glass or of resinous material of the inorganic type chosen because of the bondable properties, the ability to withstand heat or the like, depending upon the specific application, is provided with a coating of bondable material. The bondable material may be of phenol formaldehyde or any resin known in the art to be suitable which bonds with the cords on the back of the Teflon fabric 22. Only a sufficient amount of the bondable material is employed to produce a good bond with the cords, and in this manner a barrier is provided for preventing the material forming the backing portion 24 of the sleeve or the bonding material itself from penetrating into the Teflon woven fabric or therebeyond to destroy the low friction property of the face thereof. This material is illustrated in FIGURE 2 in sheet form from which strips are cut and stitched or otherwise secured together to form a sleeve 30, as illustrated in FIGURE 3. In FIGURE 4, two telescoped woven sleeve portions, one of Teflon having bondable cords on the outer face, the other of the material 23, are illustrated in bonded relation to each other.

Spools 25 made of two portions 26 and 27 are aligned by a central projection 28 on the spool portion 26 which extends within an aperture 29 in the spool portion 27. The spool portions 26 and 27 are separated and a sleeve 30 is then slid over the central portion of the spool and the spool is placed in a cylindrical aperture 32. A succession of spools are inserted in one end of the cavity and advanced out the other after the spools are retained in clamped position by the clamping members 33 at each end of the aperture 32. Any number of the spools may be provided in the cavity and any number of ejector nozzles may be employed for filling the area of the spools. In FIGURE 5 an ejector nozzle 34 is illustrated, having the material 35, which is to form the hard backing portion of the sleeve, forced therefrom under pressure produced by a piston 36. When the spool is positioned in the central part of the aperture 32, as herein illustrated, the material 35 is forced about the spool and sleeve 30, and as soon as the material becomes hardened, the clamps 33 are opened, the right-hand spool is advanced therefrom as a new spool is fed into the left-hand end. The material 35 may be of a heated plastic which is applied under a predetermined pressure to form an exact mating surface between the inner face of the sleeve 30 and the surface of the central portion of the spool. A metal may be employed as the backing material in molten or powdered form. Sufficient of the metal will enter into the interstices of the layer 23 to retain the surface of the composite sleeve against rotation, while the resin forms a barrier preventing the material from passing through the low friction material. The resin material will normally bond with the resin of the layer 23 which will act as a barrier, limiting the penetration thereof. It is within the purview of the invention to employ powdered resins and metals applied under pressure to form the body portion 24 of the resulting sleeve bearing when hardened. Where resiliency is required to the material 24, it is within the purview of the invention to employ a rubber or rubberlike material for the material 35 to thereby provide a desired degree of resiliency to the backing portion of the sleeve bearing.

In FIGURES 7 to 13 inclusive, a further form of the invention is illustrated, that wherein the low friction material is applied over a ball of a ball joint assembly. In FIGURE 6, a ball stud 40 has a polished ball 41 thereon which preferably has a rust-resisting surface which may be produced by plating chromium thereon to retain the high polish, or which may be a surface of low friction resin material, similar to the Teflon, applied in a manner as illustrated, described and claimed in the application of Charles S. White, Serial No. 583,657, filed May 9, 1956, now abandoned, for Metal Bearing Having Low Friction Resin Surfaces. When employing the rust-resisting polished surface on the ball, a seal normally employed with such ball joint assemblies may be eliminated. In the present arrangement, a pair of stampings 42 and 43 form the housing for the ball 41, having a clearance space therebetween. A cap 44, made from the material similar to that illustrated in FIGURE 2, is placed about the ball of the stud and assembled within the stampings. The assembly is mounted upon an arbor 45 having an annular end 46 which seals the space between the ball and the bottom stamping and secures the bottom edge of the material of the cap 44 to the ball. The two stampings 42 and 43 are secured together, preferably as by welding, the bolt 47 herein illustrated being employed for mounting purposes. A nozzle 48 from an injecting device forces a material 49 into the clearance space between the cap 44 and housing to fill the same under pressure. Upon the hardening of the material 49, the cap material 45 is retained in engagement with the polished surface of the ball 41 under a predetermined pressure, with both surfaces accurately mated, which pressure and mated relation are maintained throughout the life of the assembly due to the elimination of wear between the surface of the ball 41 and that of the cap 44. The material 49 may be plastic or metal which may be heated and flowed about the ball or which may be a resin or metal powder applied in cold form under pressure, which hardens thereafter. The material may have elastic properties, being rubber or a resin material having rubberlike qualities of a degree desired, depending upon the amount of cushioning required in a particular application of the ball joint.

The device as illustrated in FIGURE 8 is employed for producing the cap 44. A sleeve 51 has an annular recess 52 is the top face aligned with an annular projection 53 in a clamping ring 54. The ring is supported by rods 55 which extend through apertures in a flange 56 about a plunger 57, the end portions 58 of which are of semispherical shape. Springs 59 about the rods 55 exert a predetermined pressure upon the ring 54. Upon the downward movement of the plunger 57, a disk 61 of the material illustrated in FIGURE 2 is first clamped by the annular projection 53 which forces the edge portion of the material into the recess 52. The further downward movement of the plunger causes its semispherical end 58 to shape the material into the cap illustrated in FIGURE 7. The cap may be extended beyond the semispherical portion to have a cylindrical portion 62 therebelow which is slotted at 63 to permit the bottom portion to wrap around the bottom of the ball 41. Since the outer surface of the cap 44 is of a bondable resin material, a bonding strip 64, as illustrated in FIGURE 9, may be wrapped therearound and bonded thereto to have the cap encompass the entire area of the ball.

Another way of preparing the material for securement about the ball is illustrated in FIGURES 10 and 11 wherein wires 65 are woven into the Teflon material 66, the wires being of a nature to bond with the metal cast about the ball, or the wires may be disposed between the two layers 22 and 23 so that the resin material of the layer 23 will be available to bond with a resin material which encompasses the ball. In either arrangement, the lower part of the cap 44 has the slots 63 therein, permitting the lower portion 62 to be held around the ball by the strength of the wires 65 when the slotted portions are forced thereagainst.

In FIGURE 12 another form of cap is illustrated, that wherein a semicylindrical element 67 of the material of FIGURE 2 has a flange 68 thereabout. A similar cap 69 has the arcuate top portion cut therefrom to leave an opening 71 for the ball stud 40. The two flanges 68 may be secured together by stitching or other securing means as the two mating faces thereof are of the Teflon cloth material. An encompassing member may be produced by the arrangement illustrated in FIGURE 13 wherein the semispherical cap 72 has a cylindrical portion 73 extending beyond the center on which the sphere was struck. A lower cap portion 74, which has the central portion removed therefrom to provide an opening 71 for the stud 40, is placed on the lower end of the ball, with the cylindrical portion 73 extended thereover. A band of resin treated cloth is then heat-sealed over the point over the adjacent outer surfaces of the cap portions 72 and 74. Tight joints are thereby produced which assure the sealing off of the material forced about the ball assembly from engaging the surface of the ball 41.

Having the ball 41 encased in a cup 44 in a desirable manner, any type of housing may be formed about the ball assembly. In FIGURE 6 a single housing is illustrated formed about a ball, and in FIGURES 14 and 15 an entire A-frame 77 for an automotive vehicle is shown cast in the same operation in which housing 78 are cast about a plurality of balls to form an assembly having the ball joints thereon. The A-frame has a rod 79 on which clamps are applied for attaching the A-frame to the body or chassis frame, with the rod in fixed relation thereto. The ends of the rods are provided with balls 81 having a cap 44 thereon constructed in a manner as illustrated in FIGURES 7, 9, 11, 12 and 13, or in any other suitable manner. At the forward end, a stud 40 is employed with a similar cap 44 provided on the ball 41 thereof. The rod 79 with the balls 81 thereon and the stud 40 are assembled in the mold and the metal is then injected into the molds to form the housings and the A-frame herein illustrated. The particular A-frame cast with the housings and balls thereon is shown by way of example, as it is to be understood that a casting of any size, of resin or metal, having any number of ball joints or bearings thereon, may be made in a single operation in the same manner. The A-frame is shown having a coil spring or air suspension bag 82 secured thereon in a conventional manner. The A-frame is strengthened by cylindrical portions 83, ribs 84 and the spring pad 85.

When heated material is employed to cast the housing 78 around the ball, various degrees of shrinkage will occur depending upon the type of resin or metal employed. For normal resins, the thickness of the two-ply material of FIGURE 2 will provide sufficient resiliency to produce the desired pressure while absorbing the small amount of pressure due to shrinkage which may occur. When metal is employed, the shrinkage may be substantial and result in too much pressure between the low friction surfaces.

In FIGURE 16 a cap 44 is illustrated having a layer 86 of a cloth or other pliable material having only the face thereof bonded to the material of the layer 23 from which the cap is formed. This additional thickness of material will absorb the shrinkage, and in this manner the amount of pressure between the surface of the ball and the cap 44 will be controlled. It is to be understood that the layer 23 of the cap material prevents any bleeding of the back-up material therethrough and through the interstices of the threads of the Teflon cloth.

In FIGURE 17 a further form of cap is illustrated, that wherein a piece of woven Teflon cloth 87 is placed about the ball and a layer of metal 88 sprayed or otherwise applied to the surface in a manner to have a mechanical bond occur by the projection of the metal part way into the interstices between the threads of the cloth. Further, in this view, a coating of chromium 89 or other rustproof material, which may be resin or other metal, is applied to the surface of the ball for the purpose of rustproofing and providing a high polish thereto. When so rustproofed, the seals normally employed to prevent moisture, dirt and grime from reaching the mating surfaces are eliminated. Since the surfaces are accurately mated, none of the dust, dirt, grime and moisture can collect therebetween and perfect low friction mated surfaces are provided without the necessity of providing a bulky seal which adds cost to the joint and requires additional room therefor. It is to be understood that instead of the sprayed metal a mechanical bond may be obtained with a resin or other material or Teflon alone.

In FIGURE 18 a sheet 91, embodying a layer of Teflon, is illustrated having a layer 92 of metal, resin or other material applied thereto by a spray nozzle 93. The material will penetrate a small distance into the interstices of the woven material and will retain the threads in fixed position thereon, and while not penetrating onto the working face of the layer, will act as a barrier, preventing the backing material from doing so.

In FIGURE 19 a cylindrical mandrel 94 is illustrated, having a sleeve 95 woven from Teflon threads applied thereover. A layer of metal, resin or the like 96 is applied thereto from a spray nozzle 93. The mandrel is rotated as the layer is progressively built up upon the sleeve 95. The Teflon cloth material backed by the spray material may be employed to form caps, liners of bearings, and the like, and has the advantage of providing a barrier surface layer, one which bonds to a backing material of resin when the sprayed material is a resin, or which may bond with a backing metal when metal is sprayed on the sleeve.

In FIGURE 20 a further application of the low friction material is illustrated, that wherein the mated threads 97 of a shaft 98 and threads 99 of a nut 101 have complete surface engagement between the low friction surfaces. A sleeve 102 of the material illustrated in FIGURE 2, may be preformed into the shape of the thread 97 and screwed thereon, or the sleeve may be made in two halves and pressed into the shape of the threads and the two halves applied about the thread 97 and sealed at the abutting edges with a strip of resin material. A loose sleeve of the material may be slid over the thread and forced thereabout by the backing material when forced within the nut. When the material 107 is placed upon the thread 97, the nut 101 is screwed thereover if the thread 99 of the nut is of such diameter as to interfere with the thread 97 to prevent the disconnection of the threads in case the backing material should shear or otherwise become ineffective to maintain the sleeve material 102 in engagement with the threads 97 as illustrated in FIGURE 22. Sleeves 104 and 105 are slid upon opposite ends of the shaft 98 to seal the ends of the nut 101, after which the backing material 106 is forced through openings 107 from a cylinder 108 through apertures 109 of the nut to fill the areas between the outer surface of the sleeve 102 and the inner surface of the thread 99 of the nut. Pressure is provided by a piston 111 in the cylinder 108 to provide pressure engagement between the surfaces and to assure accurate mating relation with all points of the threads. The nut 101 is of a type employed in a steering mechanism having a rack portion 112 which engages the steering sector on an automotive vehicle. The material 106 may be a resin, metal or any other suitable material which hardens and retains the pressure engagement between the mating thread surfaces.

In FIGURE 21 a further form of the invention is illustrated, that wherein a rod end 114 is constructed by the method herein described. A polished ball 115 which, if desired, may have a rustproof coating thereon, has a sleeve 116 of the material of FIGURE 2 slid thereover. The sleeve may be in cylindrical form and may be stretched to go over the ball and may not be of sufficient elasticity to thereafter accurately engage the ball. This excess material will be forced against the ball to provide a complete area of engagement with the ball surface. The ball and sleeve are assembled in the housing 117 on the end of the rod 118 and after assembly are mounted on a supporting arm 119 by a screw 121. The end of the arm is flat to engage the flat side of the housing 117, to thereby provide a seal which prevents the escape of the backing material. The opposite side of the housing is sealed by a truncated conical surface 122 of a sleeve 123 provided on the screw 121. This truncated surface centers the ball within the housing so that substantially a uniform amount of the backing material 124 will be provided around the ball. The material is forced from a cylinder 125 by a piston 126 through an aperture 127 in the end of the housing 117. It is to be understood that the arm 119 may have a similar truncated conical surface 121 to extend within the side of the housing 117 or that the sleeve 123 may have flat sides to engage the side of the housing, the same as the flat side of the arm 119. In the latter arrangement, the arm 119 will have projections to center the housing relative to the screw 121. The material 124 may be resin or metal which may be applied hot or cold under pressure so long as the material hardens after filling the area between the ball sleeve and the inner surface of the housing. The material of the sleeve 116 may be of the type herein illustrated, the Teflon cloth backed by the sprayed metal or resin, the Teflon cloth bonded to a fabric material, as in FIGURE 2, with a further layer applied thereto on which the metal or resin may be sprayed, or may be the material illustrated in FIGURE 2 or a similar material having wires therein, as illustrated in FIGURE 10.

All of the arrangements herein illustrated and those not illustrated but coming within the scope of the invention embody the formation of bearing surfaces of the low friction type from woven Teflon material which is forced against the polished surface of an element by backing material which may be resin, metal and the like which is bonded or anchored thereto in a manner to provide a barrier which prevents the backing material from engaging the polished surface with which the Teflon material engages. The material is applied under pressure so that a pressure engagement is maintained between the surfaces. When the backing material shrinks to any substantial amount, a take-up material may be provided on the back of the low friction element to prevent too much pressure from being maintained. It is to be understood that when Teflon is mentioned herein, any other low friction materials similar to Teflon, those of the fluorocarbon series and the like, known to be suitable, may be employed. The bearing surface thus provided requires no lubricant and no seal since positive contact occurs at all points between the surfaces. The present invention provides a positive, cheap, substantially indestructible bearing relation by the use of the low friction woven cloth having many applications, only a few of which have been herein illustrated and described by way of example.

I claim:

1. A method for forming a ball and socket joint comprising the steps of placing over the ball a layered cap-like element including an inner layer of low friction pervious fibrous material engaging the surface of said ball, and an outer impervious layer, said outer impervious layer having been bonded to said inner layer, locating the ball with said cap-like element thereover within the socket such that said cap-like element is spaced from the walls of said socket, and then injecting into the socket a high strength heat hardenable organic polymeric material under heat and pressure to thereby fill the space between the socket and the cap-like element for bonding said heat hardenable material to said impervious layer, and for conforming said heat hardenable material to the shape of said ball.

2. The method of forming a ball joint comprising the steps of providing a finished surface on the ball of a stud and ball, applying over the surface of said ball a layered material having an inner layer of low friction pervious fibrous material engaging the surface of said ball, and an outer imprevious layer, said outer impervious layer having been bonded to said inner layer, supporting a housing about said ball and layered material so as to define a space therebetween with an annular opening at the throat of the ball joint, sealing said annular opening, and subsequently injecting into the space between said housing and said layered material a high strength heat hardenable organic polymeric material under heat and pressure for bonding said heat hardenable material to said impervious layer, and for conforming said heat hardenable material to the shape of said ball to journal the ball for swiveling movement within the housing.

3. The method of forming a ball joint, which includes the steps of, providing a finished surface on the ball of a stud and ball, applying a layer of low friction fibrous material against the finished surface of the ball, supporting a housing about said ball and layer of fibrous material so as to define a space therebetween with an annular opening at the throat of the ball joint, pressing the portion of said layer adjacent to said throat against the surface of the ball to retain said layer of low friction material in position on said ball, sealing said annular opening, injecting a hardenable material under pressure into the space between said housing and layer of fibrous material to conform the fibrous material to the ball, and hardening said hardenable material to journal the ball for swiveling movement within the housing.

4. The method of forming a ball joint, which includes the steps of, providing a finished surface on the ball of a stud and ball, applying a layer of low friction fabric material against the finished surface of the ball, supporting a housing about said ball and layer of fabric material so as to define a space therebetween with an annular opening, at the throat of the ball joint, inserting an annular member into said annular opening, to engage said layer of fabric material to fix it against movement relative to said housing and seal off said annular opening, injecting a hardenable material under pressure into the space between said housing and layer of fabric material to conform the fabric material to the ball, and hardening said hardenable material to journal the ball for swiveling movement within the housing.

5. The method of forming a ball joint having a ball of a stud and ball journaled in a two-piece stamped housing wherein one stamping is generally semispherical in shape having an aperture near the dome thereof and the other stamping is generally truncated spherical in shape having an enlarged opening in the lower portion thereof, which includes the steps of, positioning a cap of low friction material about said ball, positioning said one stamping loosely over the dome of said ball, positioning said second stamping over the remaining portion of the ball with the stud projecting through said opening, securing said stampings together to form a housing loosely disposed about the ball, supporting said stud in an arbor having an annular upper end portion encircling the stud near the juncture of the ball and the stud and pinching said cap against the surface of the ball to retain it in position, supporting said other stamping on the outer periphery of said annular upper end portion of the arbor in a manner to close off said opening and to centrally position the ball within the housing to define a space between the ball and housing, moving an injecting nozzle into engagement with said one stamping and communication with said aperture in a manner to force said other stamping firmly against the supporting arbor, and injecting hardenable material through said nozzle and aperture into the housing to fill said space between the ball and housing and accurately conforming said cap to the surface of the ball under pressure.

References Cited by the Examiner

UNITED STATES PATENTS

| | | | |
|---|---|---|---|
| 1,964,202 | 6/1934 | Hooper | 264—103 |
| 2,537,629 | 1/1951 | Brown | 264—242 |
| 2,691,814 | 10/1954 | Tait | 264—249 |
| 2,804,886 | 9/1957 | White. | |
| 2,812,570 | 11/1957 | Petersilie et al. | 28—80 |
| 2,838,436 | 6/1958 | Clingman | 154—110 |
| 2,865,692 | 12/1958 | Gossmann | 308—238 |
| 2,919,150 | 12/1959 | Baker. | |
| 2,954,992 | 10/1960 | Baker | 264—242 |

ROBERT F. WHITE, *Primary Examiner.*

ALEXANDER H. BRODMERKEL, *Examiner.*

F. MARLOWE, L. S. SQUIRES, *Assistant Examiners.*